United States Patent
Park (10) Patent No.: US 8,395,734 B2
(45) Date of Patent: Mar. 12, 2013

(54) LIQUID CRYSTAL DISPLAY DEVICE WITH ALIGNMENT LAYER FORMED OF A MIXTURE OF A RUBBING ALIGNMENT MATERIAL AND A UV ALIGNMENT MATERIAL

(75) Inventor: Su Hyun Park, Anyang-si (KR)

(73) Assignee: LG Display Co., Ltd., Seoul (KR)

( * ) Notice: Subject to any disclaimer, the term of this patent is extended or adjusted under 35 U.S.C. 154(b) by 863 days.

(21) Appl. No.: 11/451,445

(22) Filed: Jun. 13, 2006

(65) Prior Publication Data

US 2006/0280880 A1 Dec. 14, 2006

(30) Foreign Application Priority Data

Jun. 14, 2005 (KR) .................. 10-2005-0051035

(51) Int. Cl.
*G02F 1/1337* (2006.01)
*C09K 19/00* (2006.01)

(52) U.S. Cl. ........ 349/124; 349/123; 349/125; 349/126; 428/1.2; 428/1.26

(58) Field of Classification Search .......... 349/123–126, 349/187; 428/1.1, 1.2, 1.21, 1.25, 1.26
See application file for complete search history.

(56) References Cited

U.S. PATENT DOCUMENTS

| | | | | |
|---|---|---|---|---|
| 5,629,056 A * | 5/1997 | Koike et al. | | 428/1.26 |
| 5,764,326 A * | 6/1998 | Hasegawa et al. | | 349/124 |
| 6,091,471 A * | 7/2000 | Kim et al. | | 349/124 |
| 6,383,579 B1 * | 5/2002 | Park et al. | | 428/1.26 |
| 6,731,362 B2 * | 5/2004 | Park et al. | | 349/123 |
| 6,844,905 B2 * | 1/2005 | Yamada et al. | | 349/123 |
| 6,900,271 B2 * | 5/2005 | Gibbons et al. | | 525/180 |
| 2004/0039150 A1 * | 2/2004 | Shin et al. | | 528/170 |

FOREIGN PATENT DOCUMENTS

| | | | |
|---|---|---|---|
| KR | 10-0206560 B1 | | 12/1997 |
| KR | 10-2004-0035437 | * | 4/2004 |
| KR | 10-2004-0035437 A | | 4/2004 |

* cited by examiner

*Primary Examiner* — Bumsuk Won
*Assistant Examiner* — Paisley L Arendt
(74) *Attorney, Agent, or Firm* — Birch, Stewart, Kolasch & Birch, LLP (57) ABSTRACT

An LCD device includes first and second substrates, an alignment layer formed over at least one of the substrates, and a liquid crystal layer formed between the substrates. The alignment layer is formed of a mixture of rubbing alignment and UV alignment materials. A method of fabricating the LCD device includes preparing first and second substrates; coating an alignment layer over at least one of the substrates; performing a rubbing process on the substrate coated with the alignment layer; and irradiating polarized UV rays onto the substrate coated with the alignment layer, wherein the alignment layer is formed of a mixture of rubbing alignment a UV alignment materials. The rubbing process obtains high anchoring energy is obtained, thereby preventing afterimages. Also, the process of irradiating the polarized UV rays eliminates the problem of light leakage.

8 Claims, 8 Drawing Sheets

LIQUID CRYSTAL DISPLAY DEVICE WITH ALIGNMENT LAYER FORMED OF A MIXTURE OF A RUBBING ALIGNMENT MATERIAL AND A UV ALIGNMENT MATERIAL

This application claims the benefit under 35 U.S.C. §119 of Korean Application No. 10-2005-0051035, filed on Jun. 14, 2005, which is hereby incorporated by reference as if fully set forth herein.

BACKGROUND OF THE INVENTION

1. Field of the Invention

A liquid crystal display (LCD) device has at least one substrate with a coated alignment layer, and more particularly, to an alignment layer for initial alignment of a liquid crystal in an LCD device.

2. Discussion of the Related Art

Ultra thin flat panel display devices have a display screen with a thickness of several centimeters. Among these, LCD devices have been widely used for notebook computers, monitors, spaceships, aircrafts, etc. owing to their advantageous features of low driving voltage, low power consumption, portability, and the like.

Generally, an LCD device includes a color filter substrate having color filter layers formed thereon, a thin film transistor substrate facing the color filter substrate and having thin film transistors formed thereon, and a liquid crystal layer formed between these substrates.

In such an LCD device, alignment of the liquid crystal layer is varied by applying a voltage to control transmittance of light, thereby allowing an image to be reproduced. Electrodes are thus formed on the thin film transistor substrate and/or the color filter substrate for application of the voltage such that a pixel electrode is located on the thin film transistor substrate, and a common electrode is located on the color filter substrate so as to generate a vertical electric field between the two substrates (for example, twisted nematic (TN) mode). Alternately, the pixel electrode and the common electrode are located parallel to each other on the thin film transistor substrate so as to generate a horizontal electric field (for example, in-plane switching (IPS) mode).

Figure 1:
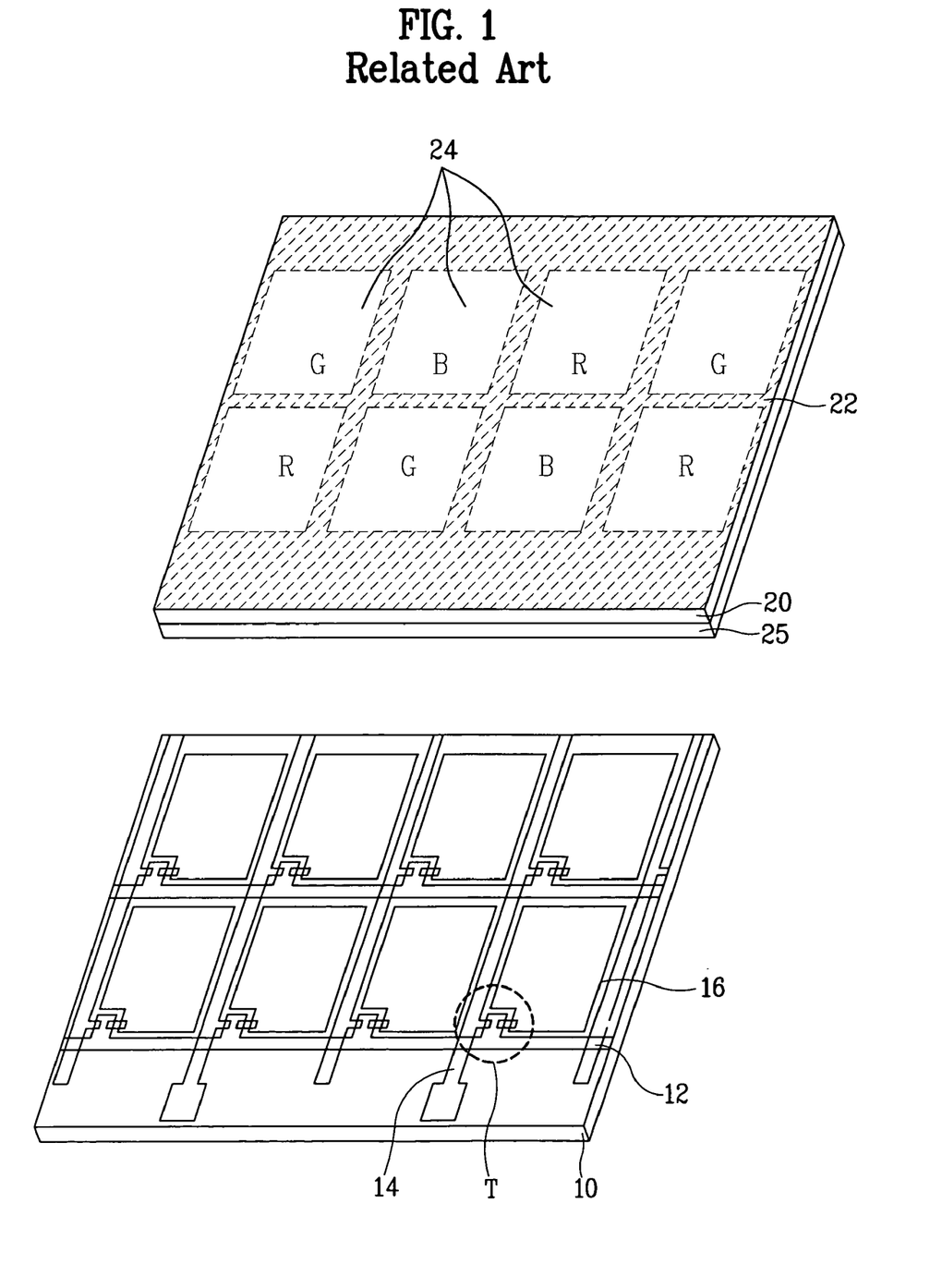
FIG. 1 shows an exploded perspective view illustrating a related art TN mode LCD device.

FIG. 1 shows an exploded perspective view illustrating a related art TN mode LCD device.

As shown in FIG. 1, a thin film transistor substrate 10 includes a gate line 12, a data line 14 crossing the gate line 12, a thin film transistor T formed on a crossing region of the gate line 12 and the data line 14, and a pixel electrode 16 connected to the thin film transistor T. A color filter substrate 20 includes a light-shielding layer (or black matrix) 22, R, G and B color filter layers 24 formed on the light shielding layer 22, and a common electrode 25 formed on the color filter substrate 20.

A vertical electric field is generated between the pixel electrode 16 on the thin film transistor substrate 10 and the common electrode 25 on the color filter substrate 20, thereby allowing alignment of liquid crystals to be controlled.

Both substrates 10 and 20, constructed as described above, are bonded to each other to form a single liquid crystal panel. At this time, a liquid crystal layer is formed between the substrates 10 and 20.

Meanwhile, if the liquid crystal layer randomly aligns between the substrates 10 and 20, it is difficult to achieve a consistent arrangement of molecules in the liquid crystal layer. Thus, although not shown in the drawings, an alignment layer for the initial alignment of liquid crystals is formed on the thin film transistor substrate 10 and/or the color filter substrate 20.

Examples of a method for forming an alignment layer for initial alignment of the liquid crystal include a rubbing alignment method and a photo-alignment method.

In the rubbing alignment method, after an organic polymer such as polyimide is thinly coated on a substrate, a rubbing roll wound with a rubbing cloth is rotated to rub the organic polymer, thereby arranging the organic polymer in a constant direction.

However, the rubbing alignment method has the following drawbacks.

Figure 2:
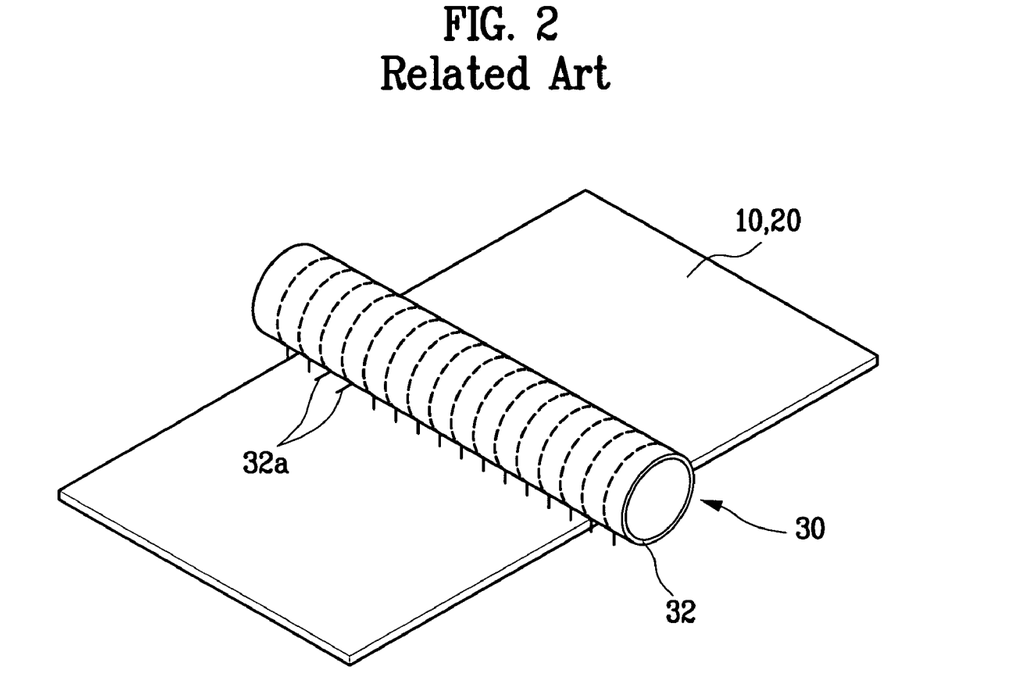
FIGS. 2 and 3 illustrate problems of a related art rubbing alignment method.

First, when the arrangement of the rubbing cloth becomes disordered, problematic light leakage may occur. FIG. 2 shows a schematic perspective view illustrating a disordered arrangement of the rubbing cloth.

As described above, since the structure such as the thin film transistor, the color filter layer and the electrode layers are formed on the substrate, some portion 32a of the rubbing cloth 32 wound around the rubbing roll 30 can become disordered when the rubbing roll 30 rotates on the structure formed on the substrate 10 or 20 as shown in FIG. 2. When the arrangement of the rubbing cloth becomes disordered, the chains of the organic polymer in a region rubbed by the disordered rubbing cloth cannot be aligned, resulting in light leakage in that region due to non-uniform alignment of the liquid crystals.

Figure 3:
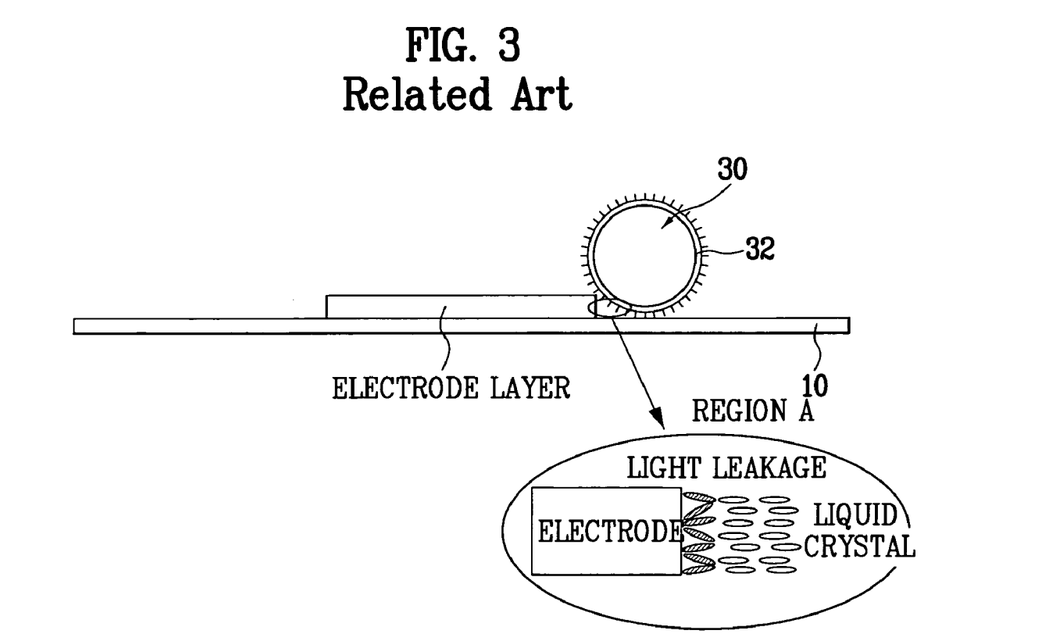

Second, when the rubbing cloth fails to contact the substrate, the problem-causing light leakage may occur. FIG. 3 shows a schematic perspective view illustrating an alignment state of the liquid crystals when the rubbing cloth fails to contact the substrate.

As described above, the electrode layers such as the pixel electrode and common electrode are formed on the substrate. Thus, as shown in FIG. 3, a region A where the rubbing cloth 32 fails to contact the substrate due to a step on the substrate 10 is formed. In this case, the alignment of the liquid crystals is not uniform in the region A, thereby causing the problem of light leakage.

In particular, in the TN mode LCD device, since the pixel electrode and the common electrode are formed in pixel regions on different substrates, respectively, there may not be very many regions having the steps formed thereon. However, in the in-plane switching (IPS) mode LCD device, since the pixel electrode and the common electrode are repeatedly formed in parallel in pixel regions on the substrate, there are many regions having the step formed thereon, whereby the problem of light leakage becomes serious.

The aforementioned problems in the rubbing alignment method are caused by the mechanism for providing physical contact between the rubbing roll and the substrate.

Recently, in order to solve these problems of the rubbing alignment method, various studies have been conducted for providing a method for manufacturing an alignment layer that does not require physical contact. In particular, instead of using the rubbing alignment method, use of a photo-alignment method has been suggested. In the photo-alignment method, an alignment layer is produced by irradiating polarized ultraviolet (UV) rays onto a polymeric film. In order to align the liquid crystals, the alignment layer must have an anisotropic structure, which can be formed when the polymeric film anisotropically reacts with the polarized UV rays.

However, although the photo-alignment method may address the above-described problems related to the rubbing alignment method described above, the photo-alignment method has a serious problem in that the anchoring energy is low. More specifically, with the rubbing alignment method, since the side chains of the organic polymer are arranged in the constant direction as described above, and grooves are uniformly formed over the surface of the substrate by rubbing, the alignment of the liquid crystals is controlled by mechanical interaction between the grooves and the liquid crystals as well as by chemical interaction between the side chains and the liquid crystals. In contrast, in the photo-alignment method, the alignment of the liquid crystals is controlled only by the chemical interaction between the side chains and the liquid crystals caused only by the photoreaction, without forming grooves on the surface of the substrate. Accordingly, in comparison to the rubbing alignment method, the photo-alignment method provides a lower anchoring energy and causes a problem of afterimage.

Since the problem of afterimage caused by the photo-alignment method is serious to such an extent that the method cannot be applied to large-scale production lines, the rubbing alignment method has been used for large production lines in spite of the light leakage problems.

As LCD devices of a higher quality have been increasingly required, there is a need to developing a method of aligning the liquid crystals that can overcome or minimize the problems of the rubbing alignment method and the photo-alignment method according to the related art.

SUMMARY OF THE INVENTION

Accordingly, the invention is directed to an LCD device and a method of fabricating the same, which substantially obviate one or more problems due to limitations and disadvantages of the related art.

An object of the invention, in part, is to provide an LCD device and a method of fabricating the same, in which problems of both the rubbing alignment method and the photo-alignment method can be solved.

To achieve these objects and other advantages and in accordance with the purpose of the invention, as embodied and broadly described herein, a method of fabricating an LCD device includes preparing first and second substrates; coating an alignment layer over at least one of the substrates; performing a rubbing process on the substrate coated with the alignment layer; and irradiating polarized UV rays onto the substrate coated with the alignment layer, where the alignment layer is formed of a mixture of rubbing alignment material and UV alignment material.

In another aspect of the invention, an LCD device includes first and second substrates, an alignment layer formed over at least one of the substrates, and a liquid crystal layer formed between the substrates, where the alignment layer is formed of a mixture of a rubbing alignment material and a UV alignment material.

It is to be understood that both the foregoing general description and the following detailed description of the invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION

Reference will now be made in detail to the preferred embodiments of the invention, examples of which are illustrated in the accompanying drawings. Wherever possible, the same reference numbers will be used throughout the drawings to refer to the same or like parts.

The invention addresses the problems of the conventional methods by combining a rubbing alignment method and a photo-alignment method. In other words, with the rubbing alignment method, when arrangement of a rubbing cloth becomes disordered or the rubbing cloth fails to contact the substrate, the alignment material coated on a region does not align with a constant alignment direction. Thus, the inventors of the present application recognized this problem and conceived a method for causing the portion(s) of the alignment material not aligned by the rubbing alignment method of the related art to be aligned by a photo-alignment method configured to address this need. Also, using the rubbing alignment method solves problems relating to low anchoring energy in the photo-alignment method.

Therefore, in order to use both the rubbing alignment method and the photo-alignment method in the invention, the alignment layer is formed of a mixture of at least a rubbing alignment material and a UV alignment material.

If the mixed material of rubbing alignment material and UV alignment material is used, phase separation occurs between the rubbing alignment material and the UV alignment material when the temperature increases. Therefore, in order to prevent phase separation from occurring, the rubbing alignment material preferably has polarity and structure similar to those of the UV alignment material.

The invention also utilizes, as the UV alignment material, a material that generates a photo-isomerization reaction or a photo-dimerization reaction in the photo-alignment method. Hereafter, the photoreaction in the photo-alignment method and the reason why the photo-isomerization reaction or the photo-dimerization reaction is selected in the invention will be described.

The photo-alignment method may be classified into a photo-decomposition reaction, a photo-isomerization reaction, or a photo-dimerization reaction depending on the kind of reaction between the utilized alignment material and the UV rays.

Figure 4:
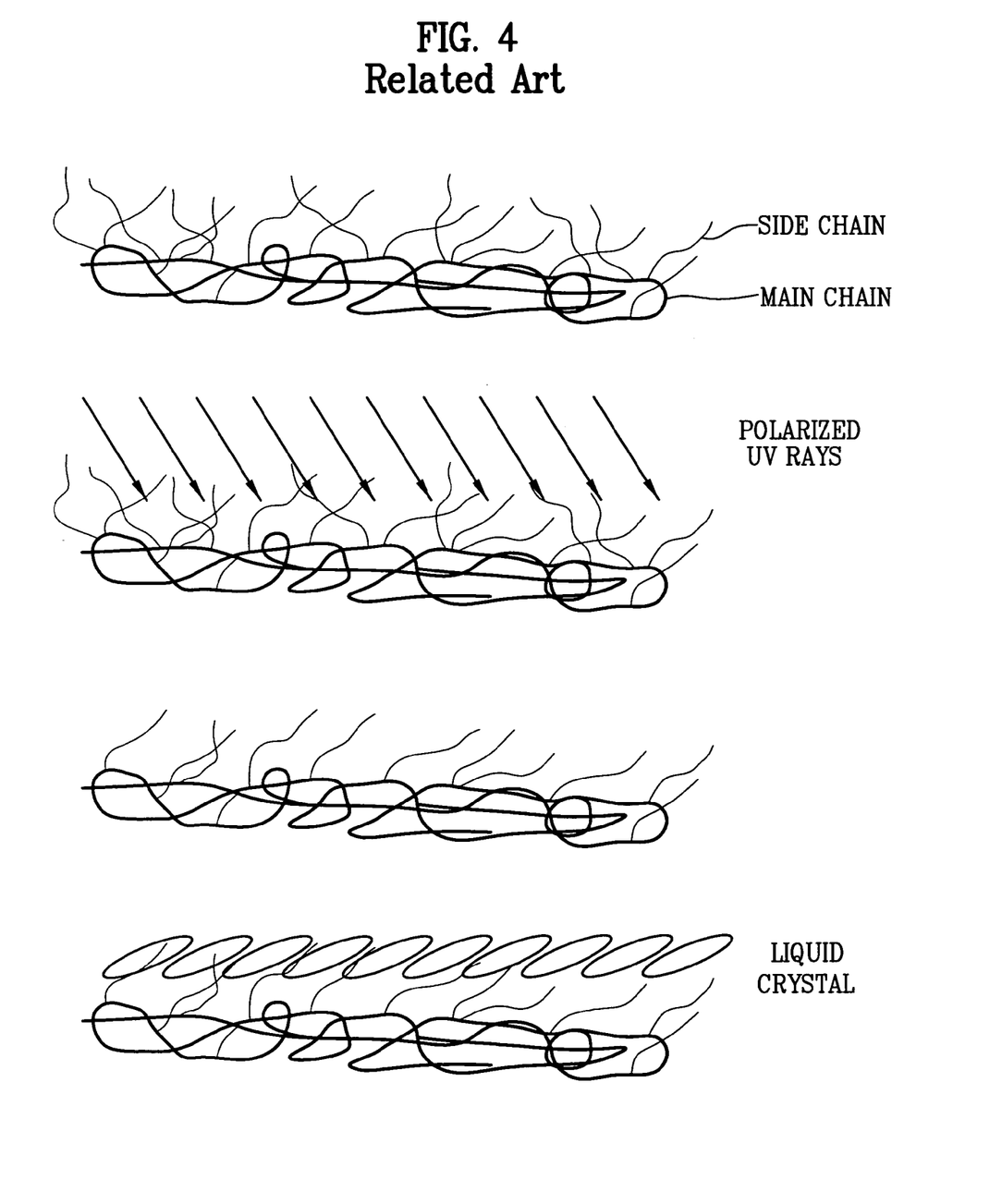
FIG. 4 illustrates a related art photo-alignment method using a photo-decomposition reaction.

In the photo-decomposition reaction, as shown in FIG. 4, when polarized UV rays are irradiated to the polymer alignment layer, a connection between side chains located in a polarized direction decomposes, and thus only the side chains vertical to the polarized direction remain, thereby allowing the liquid crystals to align in that direction.

Figure 5:
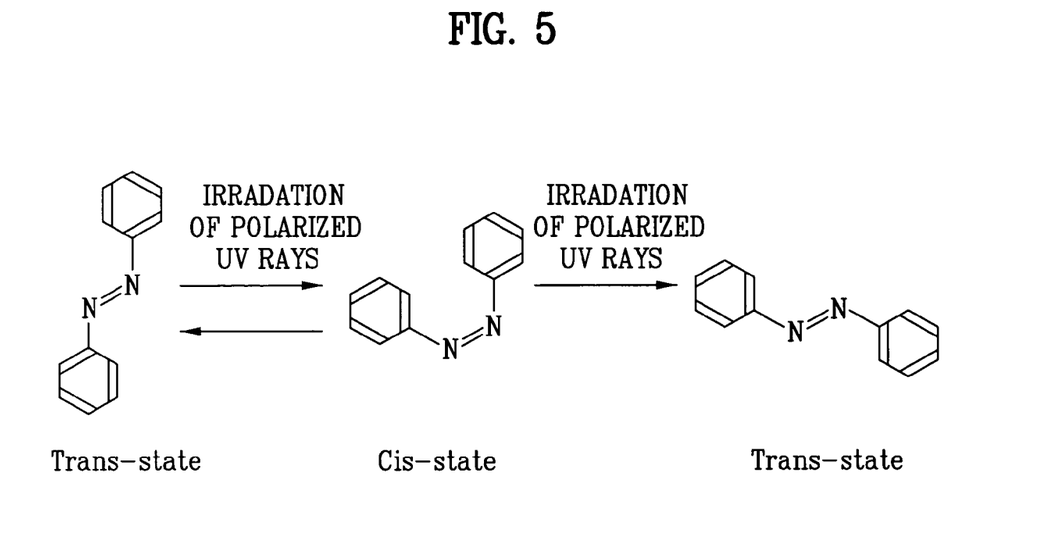
FIG. 5 illustrates a photo-alignment method using a photo-isomerization reaction according to the invention.

In the photo-isomerization reaction, as shown in FIG. 5, when the polarized UV rays are irradiated to the polymer alignment material, a cis-state polymeric material can convert to a trans-state polymeric material, and vice versa. In the case of cis-state polymeric material, the side chains are aligned parallel to the substrate, so that the liquid crystals are aligned parallel to the substrate (homogeneous alignment). In the case of trans-state polymeric material, the side chains are aligned vertical to the substrate, so that the liquid crystals are aligned vertical to the substrate (homeotropic alignment).

Figure 6:
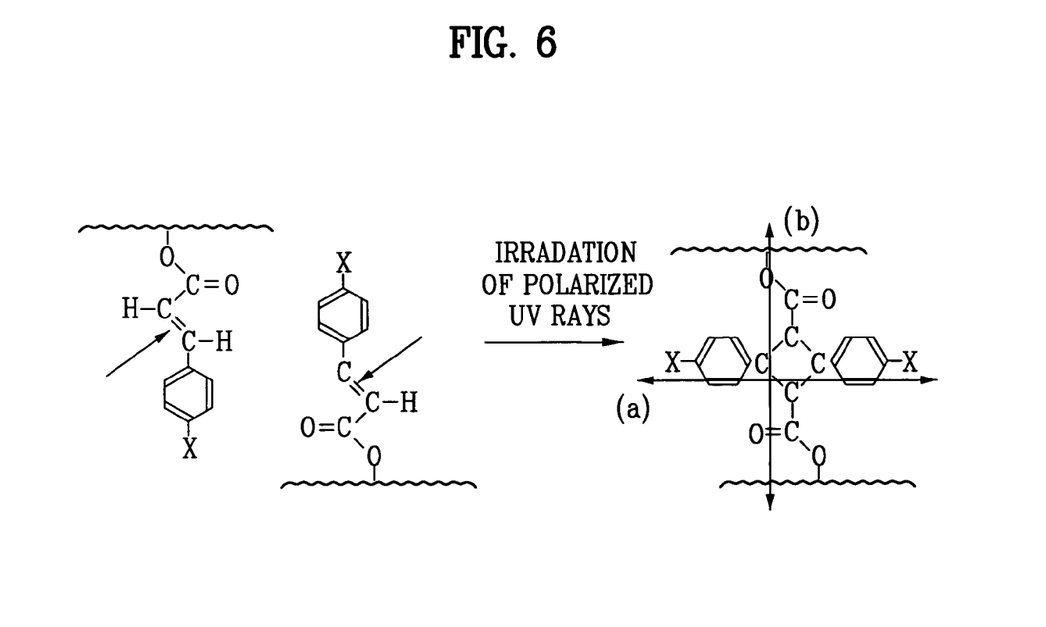
FIG. 6 illustrates a photo-alignment method using a photo-dimerization reaction according to the invention.

In the photo-dimerization reaction, as shown in FIG. 6, when the polarized UV rays are irradiated, double bonds (marked by an arrow) parallel to the polarization direction are broken and bond to adjacent molecules. As a result, the liquid crystals align along the direction in which anisotropy is induced (that is, vertical or horizontal to the polarization direction).

According to the photo-decomposition reaction of the photo-alignment method, a first problem may occur in that anchoring energy is lowered as the bonding of the alignment layer well aligned by rubbing decomposes. Second, afterimage occurs due to foreign matter generated by the photo-decomposition reaction. Third, a step of removing the foreign matter must additionally be provided to solve the problem relating to afterimage. In this case, a cleaning solution is required to remove the foreign matter, i.e., detritus, of the polymer material.

Therefore, the invention addresses the photo-isomerization reaction or the photo-dimerization reaction of the photo-alignment method.

As described above, the invention combines the rubbing alignment material and the UV alignment material, where the rubbing alignment material has polarity and structure similar to that of the UV alignment material. In addition, the invention may use the material that generates a photo-isomerization reaction or a photo-dimerization reaction, as the UV alignment material.

A polymeric material containing a polymer main chain and a photo-reaction group connected to the polymer main chain is preferably used as the UV alignment material.

The photo-reaction group is preferably selected from at least one of a cinnamoyl based material, a chalcone based material, a coumarine based material, a maleimide based material, or an azo based material.

The polymer main chain is preferably selected from a polyimide, polyamic acid, polynorbornene, phenylmaleimide, polyvinylalcohol, polyamideimide, polyethyleneimine, polyamide, polyethylene, polystyrene, polyphenylenephthalamide, polyester, polyurethane, polymethylmethacrylate, an azo side-chain type imide, a stilbene main-chain type imide, coumarine derivatives, and chalcone derivatives. Copolymers of these materials may also be used.

The rubbing alignment material is preferably at least one of polyimide, polyamic acid, polyamide, polynorbornene, polyamideimide, polyvinyl, polyolefine, polystyrene, polyacrylate, poly(vinylchloride), polyether, polyester, polythioether, polysulfone, polyethersulfone, polyetheretherketone, polyurea, polyurethane, polybenzimidazol, polyacetal, or poly(vinylacetate).

Also, in an exemplary method of fabricating an LCD device according to the invention, the rubbing process and the UV irradiation process may be performed simultaneously or separately (at different times). If the rubbing process and the UV irradiation process may be performed separately (at different times), the rubbing process may be performed before the UV irradiation process, and vice versa.

Furthermore, the UV irradiation process may be performed over the entire surface of the substrate having the alignment material coated thereon, or the UV irradiation process may be performed at a region where a step is formed on the substrate having the alignment material coated thereon. That is, when the rubbing cloth fails to contact the substrate, a step is formed on the substrate, and thus the polarized UV rays may be irradiated to the region where the step is formed (in other words, the polarized UV rays may be irradiated to the step region while shielding regions other than the step region with a mask). When the alignment of the rubbing cloth becomes disordered and the step forms on the substrate, the polarized UV rays are preferably irradiated over the entire surface of the substrate.

When the polarized UV rays are irradiated only on the step regions, different step regions are formed depending on whether the substrate is the thin film transistor substrate or the color filter substrate. Even when the substrates are the same, the different step regions are formed depending on whether the LCD device is a TN mode or an IPS mode.

Hereinafter, a preferred embodiment of the invention will be described in more detail.

Figure 7:
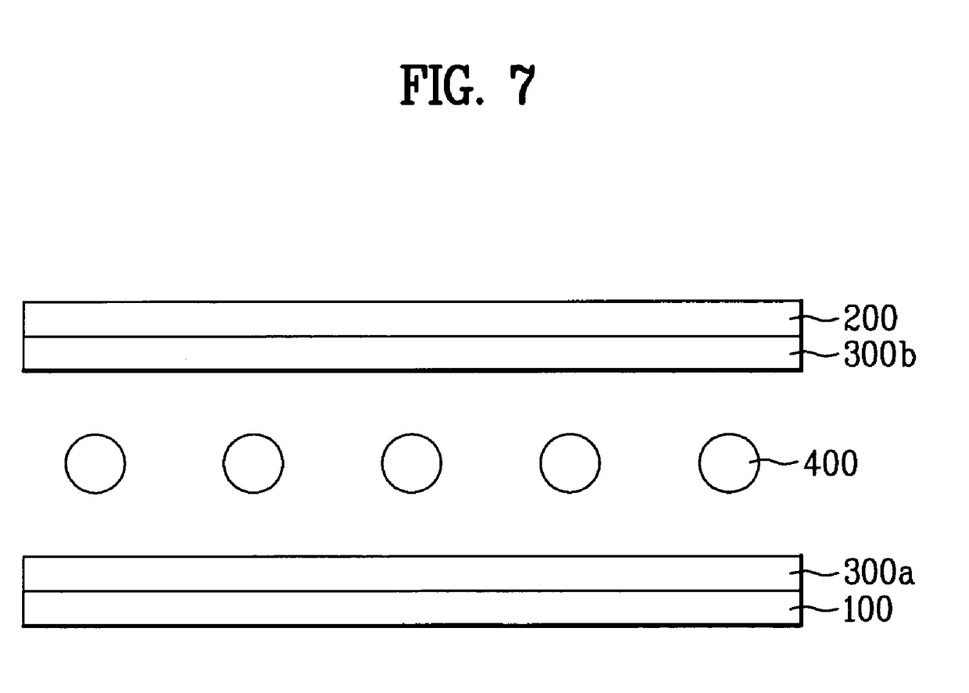
FIG. 7 is a sectional view illustrating an LCD device according to an embodiment of the invention.

FIG. 7 shows a sectional view illustrating an LCD device according to the embodiment of the invention.

As shown in FIG. 7, the LCD device according to the embodiment of the invention includes a lower substrate 100, an upper substrate 200, alignment layers 300a and 300b formed on the substrates 100 and 200, and a liquid crystal layer 400 formed between the substrates 100 and 200.

Although not shown in detail, various modifications can be made in the structures of the lower substrate 100 and the upper substrate 200 depending on the different possible modes of the LCD device.

As such, the lower substrate 100 of the TN mode LCD device includes a gate line and a data line crossing each other to define a pixel region thereon; a thin film transistor formed on a crossing region of the gate line and the data line, the thin film transistor including a gate electrode, a source electrode and a drain electrode; and a pixel electrode connected to the drain electrode of the thin film transistor. The upper substrate 200 of the TN mode LCD device may include a light-shielding layer; R, G and B color filter layers formed on the light-shielding layer; and a common electrode formed on the color filter layers.

The lower substrate 100 of the IPS mode LCD device may include a gate line and a data line crossing each other to define a pixel region thereon; a thin film transistor formed on a crossing region of the gate line and the data line, the thin film transistor including a gate electrode, a source electrode and a drain electrode; a pixel electrode connected to the drain electrode of the thin film transistor; and a common electrode formed parallel to the pixel electrode. The upper substrate 200 of the IPS mode LCD device may include a light-shielding layer; R, G and B color filter layers formed on the light-shielding layer; and an overcoat layer formed on the color filter layers.

In addition, a spacer (not shown) may be formed between the substrates 100 and 200 to maintain a cell gap between the substrates 100 and 200. A ball spacer or a column spacer may be used as the spacer.

The alignment layers 300a and 300b are formed of a mixture of a rubbing alignment material and a UV alignment material.

Preferably, the mixture ratio of the rubbing alignment material and the UV alignment material is in the range of about 1:100 to 100:1. Other preferred ranges may include 1:50 to 50:1 and 1:20 to 20:1. If the content of the rubbing alignment material becomes too large, light leakage may increase due to rubbing defects. If the content of the UV alignment material becomes too large, afterimage may increase due to low anchoring energy. Therefore, the mixture ratio of the rubbing alignment material and the UV alignment material can be selected appropriately considering the size of the LCD device.

A material that generates a photo-isomerization reaction or a photo-dimerization reaction by UV rays is preferably used as the UV alignment material.

Such a material is preferably a polymer obtained by combining a photo-reaction group with a polymer main chain, The photo-reaction group may be at least one of cinnamoyl based material, a chalcone based material, a coumarine based material, a maleimide based material, or an azo based material. Copolymers using these materials may also be used.

The polymer main chain is preferably at least one of a polyimide, polyamic acid, polynorbornene, phenylmaleimide, polyvinylalcohol, polyamideimide, polyethyleneimine, polyamide, polyethylene, polystyrene, polyphenylenephthalamide, polyester, polyurethane, polymethylmethacrylate, an azo side-chain type imide, a stilbene main-chain type imide, coumarine derivatives, and chalcone derivatives. Copolymers using these materials may also be used.

More preferably, the UV alignment material is a compound expressed by the following chemical formulas 1 to 4.

Chemical formula 1

Chemical formula 2

Chemical formula 3

Chemical formula 4

In the chemical formulas 1 to 4, n and m are integers of 1 or more.

Preferably, the UV alignment material has λmax in the range of about 270 nm to 350 nm so as not to generate any decomposition reactions due to the UV rays. Also, the UV alignment material preferably has hardness not less than 2H, corresponding to hardness of a pencil, so as to withstand the rubbing process.

The rubbing alignment material is preferably at least one of polyimide, polyamic acid, polyamide, polynorbornene, polyamideimide, polyvinyl, polyolefine, polystyrene, polyacrylate, poly(vinylchloride), polyether, polyester, polythioether, polysulfone, polyethersulfone, polyetheretherketone, polyurea, polyurethane, polybenzimidazole, polyacetal, and poly(vinylacetate). Copolymers using these materials may also be used.

More preferably, the rubbing alignment material is at least one of a polyimide compound or a polyamic acid compound expressed by the following chemical formulas 5 to 7.

Chemical formula 5 where R is selected from $X_1$ is selected from O, $CH_2$, and m is an integer 1 or more.

Chemical formula 6 where $X_1$ is selected from O, $CH_2$, and m is an integer of 1 or more.

Chemical formula 7 where $X_1$ is selected from O, $CH_2$,

-continued and m is an integer of 1 or more.

The alignment layer is preferably formed in such a manner that the UV alignment material is located over the rubbing alignment material. In this case, since the UV alignment material contacts the air, the UV alignment material preferably has a polarity lower than the rubbing alignment material.

Also, in order to mix the rubbing alignment material with the UV alignment material well, it is preferable that surface tension of each material is low. Preferably, the surface tension of each material is in the range of about 30 to 60 dyne/cm considering contact with the substrate. If the UV alignment material is located over the rubbing alignment material, the surface tension of the rubbing alignment material may be preferably equal to or greater than that of the UV alignment material.

FIGS. 8A to 8E are process views illustrating a method of fabricating an LCD device according to a preferred embodiment of the invention.

Figure 8A:
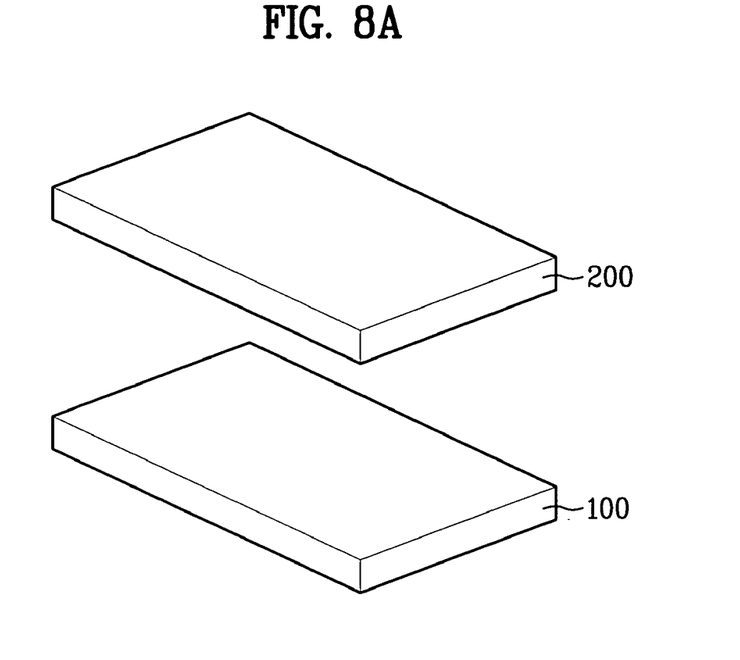
FIGS. 8A to 8E are process views illustrating a method of fabricating an LCD device according to an embodiment of the invention.

First, as shown in FIG. 8A, a lower substrate 100 and an upper substrate 200 are prepared. The detailed construction of the lower substrate 100 and the upper substrate 200 and the method for forming them can be varied by various methods.

Figure 8B:
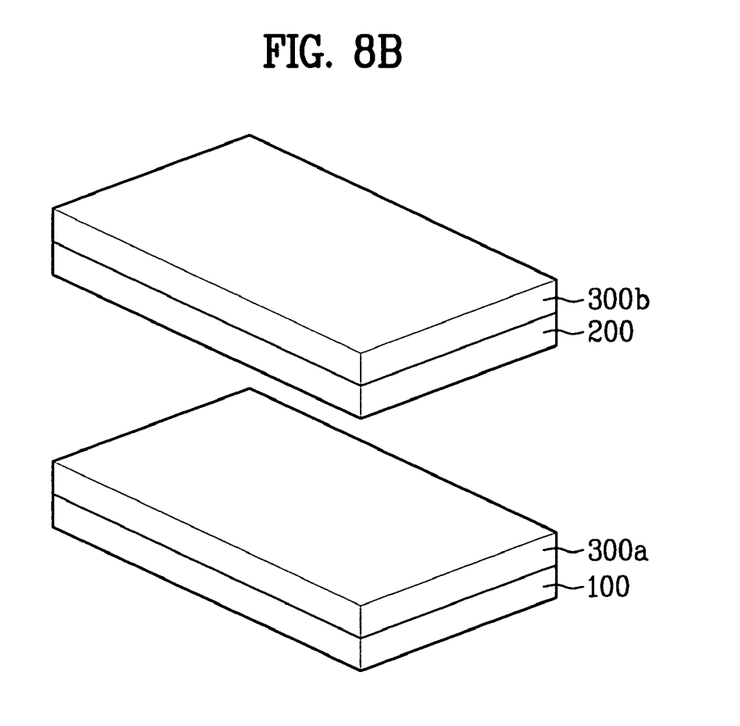

Afterwards, as shown in FIG. 8B, alignment layers 300a and 300b are coated over the lower substrate 100 and the upper substrate 200. Although the alignment layers 300a and 300b are formed over both substrates 100 and 200 in the drawing, they are not limited to this case.

Since the alignment layers 300a and 300b are formed of the same material as discussed above, a detailed description of the material will be omitted here.

The coating of the alignment layers 300 and 300b is accomplished by printing the alignment layers over the substrates 100 and 200, followed by curing the printed alignment layers.

The step of printing the alignment layers is preferably performed by spin coating or roll coating after dissolving the alignment component in an organic solvent. Other types of coating methods, such as gravure coating, may also be used.

The step of curing the printed alignment layers is preferably performed by twice curing at a temperature range between about 60° C. and 80° C. and between about 80° C. and 230° C.

Figure 8C:
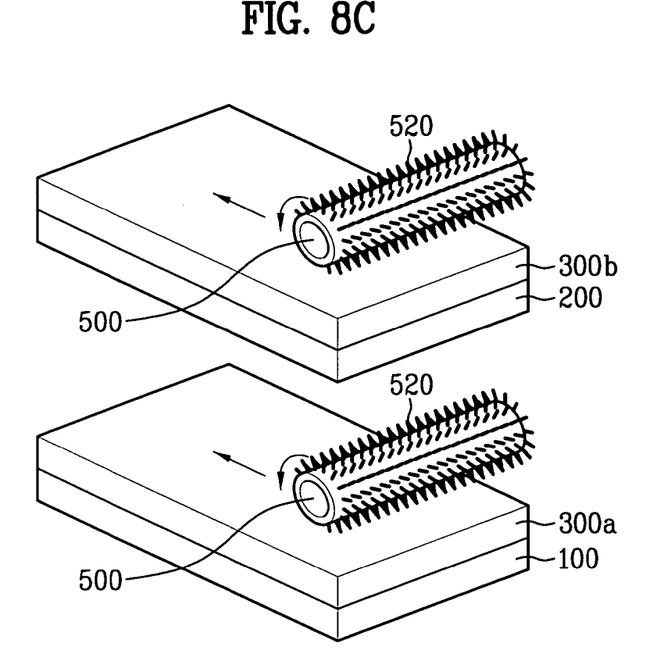

Afterwards, as shown in FIG. 8C, a rubbing process is performed on the substrates 100 and 200 coated with the alignment. layers 300a and 300b. Rubbing a rubbing roll 500, attached with a rubbing cloth 520, in the desired alignment direction, performs the rubbing process.

Figure 8D:
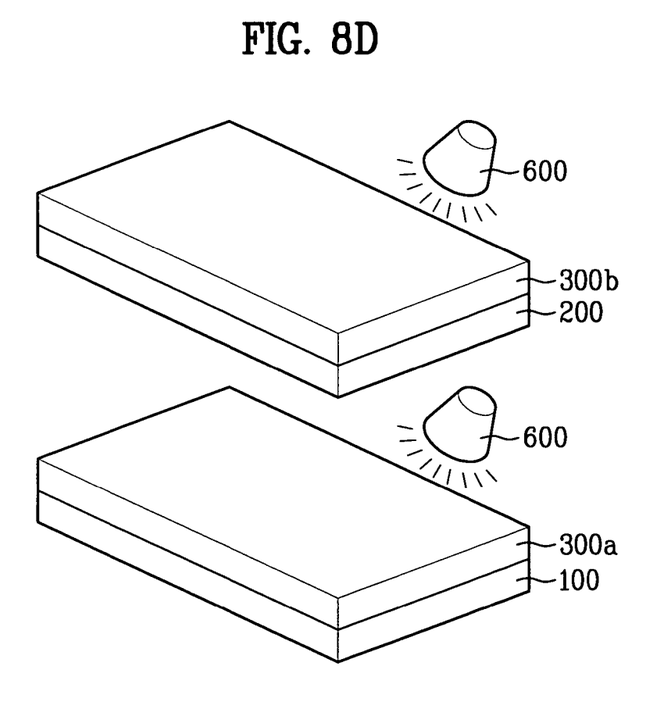

Then, as shown in FIG. 8D, polarized UV rays are irradiated to the substrates 100 and 200 where the rubbing process has been completed, using a UV irradiation device 600.

The UV irradiation process may be performed after the rubbing process. However, it should be noted that the invention is not limited to this sequence. Thus, the rubbing process may be performed after the UV irradiation process, or the rubbing process and the UV irradiation process may be performed simultaneously.

The rubbing process and the UV irradiation process are performed such that the alignment direction of the alignment layers according to the rubbing process becomes identical with the alignment direction of the alignment layers according to the UV irradiation process.

The UV rays may be irradiated over the entire surface of the substrates 100 and 200, or only on the step regions where steps are formed on the substrates 100 and 200.

If the display is a TN mode LCD device, the step may be formed at a region for the gate line, the data line, and the thin film transistor on the lower substrate 100. If the display is an IPS mode LCD device, the step may be formed at a region for the gate line, the data line and the thin film transistor and a region for the pixel electrode and the common electrode over the lower substrate 100. Therefore, the UV rays may be irradiated to the step region while shielding regions other than the step region with a mask.

Preferably, the irradiation wavelength of the polarized UV rays is in the range of about 270 nm to 400 nm, and the irradiation energy thereof is in the range of about 50 mJ to 5000 mJ.

As for the polarized UV rays, partially polarized UV rays or linearly polarized UV rays may be used.

Additionally, the polarized UV rays may be irradiated obliquely or vertically to the substrate. In the case of oblique irradiation, the irradiation angle is preferably about 60° or less. Irradiation of the polarized UV rays may be performed by a scan type light exposure method or by an entire light exposure method.

Figure 8E:
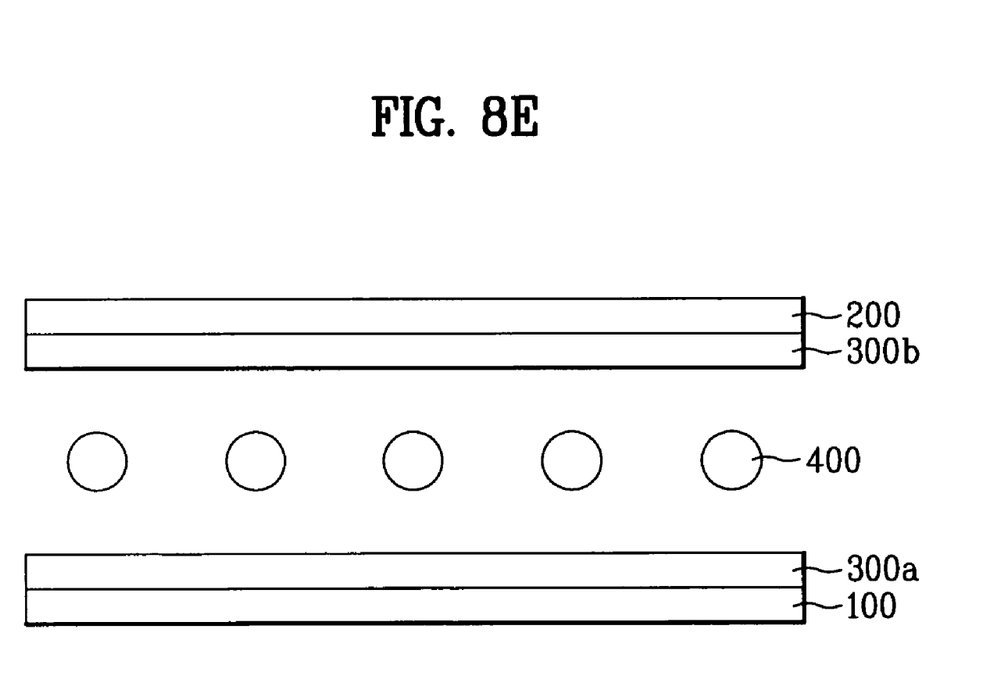

Afterwards, as shown in FIG. 8E, the substrates 100 and 200 are bonded to each other.

The step of bonding the substrates 100 and 200 to each other may be performed by a vacuum injection method or a liquid crystal dropping method.

The vacuum injection method injects the liquid crystal using the pressure difference under the vacuum state after bonding the substrates 100 and 200 to each other. The liquid crystal dropping method is to bond the substrates to each other after dropping the liquid crystal onto any one of the substrates. As the size of the substrate increases, the liquid crystal dropping method is preferred since the vacuum injection method requires an increased liquid injection time, resulting in reduced productivity.

The LCD device fabricated in accordance with the invention has the following advantages.

First, since the rubbing process and the UV irradiation process are performed using the mixture material of the rubbing alignment material and the UV alignment material, high anchoring energy is obtained through the rubbing process, thereby failing to generate afterimage. In addition, since the UV irradiation process is performed, the LCD device does not suffer from the problem of light leakage generated when the arrangement of the rubbing cloth is disordered or when the rubbing cloth fails to contact the substrate in the rubbing alignment method.

Moreover, since the polymeric material that generates the photo-isomerization reaction or the photo-dimerization reaction is used as the UV alignment material, the UV irradiation process does not generate photo-decomposition products. Therefore, problems relating to afterimages caused by foreign matter and the necessary additional cleaning do not occur.

It will be apparent to those skilled in the art that various modifications and variations can be made in the invention without departing from the spirit or scope of the inventions. Thus, it is intended that the invention covers the modifications and variations of this invention provided they come within the scope of the appended claims and their equivalents.

What is claimed is:

1. An LCD device comprising:
   first and second substrates;
   an alignment layer formed over at least one of the substrates; and
   a liquid crystal layer formed between the substrates,
   wherein the alignment layer is formed of a mixture of a rubbing alignment material and an UV alignment material,
   wherein an alignment direction of the rubbing alignment material is identical with an alignment direction of the UV alignment material,
   wherein the alignment direction of the rubbing alignment material is formed by rubbing a rubbing roll attached with a rubbing cloth,
   wherein the alignment direction of the UV alignment material is formed by irradiating polarized UV rays,
   wherein the UV alignment material is a compound having any one of following chemical formulas 2 and 3:

Chemical formula 2

Chemical formula 3 wherein n and m are integers of 1 or more, and
wherein the rubbing alignment material is a compound selected from a polyimide compound or a polyamic acid compound having the following chemical formulas 5 to 7:

Chemical formula 5 wherein R is selected from the group consisting of

, and $X_1$ is selected from the group consisting of O, $CH_2$, and m is integer of 1 or greater, Chemical formula 6 wherein $X_i$ is selected from the group consisting of O, $CH_2$, and m is integer of 1 or greater,

Chemical formula 7 wherein $X_1$ is selected from the group consisting of O, $CH_2$, and m is integer of 1 or greater.

2. The LCD device as claimed in claim 1, wherein a mixture ratio of the rubbing alignment material and the UV alignment material is in the range of 1:100 to 100:1.

3. The LCD device as claimed in claim 1, wherein the UV alignment material is a material that generates a photo-isomerization reaction or a photo-dimerization reaction by a UV irradiation process.

4. The LCD device as claimed in claim 1, wherein the UV alignment material has λmax in a range of about 270 nm to 350 nm so as not to generate a decomposition reaction due to the UV rays.

5. The LCD device as claimed in claim 1, wherein the UV alignment material has a hardness not less than 2H corresponding to pencil hardness.

6. The LCD device as claimed in claim 1, wherein the UV alignment material has a polarity lower than the rubbing alignment material.

7. The LCD device as claimed in claim 1, wherein the rubbing alignment material and the UV alignment material respectively have surface tensions in a range of about 30 to 60 dyne/cm.

8. The LCD device as claimed in claim 7, wherein the surface tension of the rubbing alignment material is equal to or greater than that of the UV alignment material.

* * * * *